June 17, 1924.

F. L. SMITH 1,497,951

PORTABLE POWER LATHE AND GRINDING MACHINE

Filed May 31, 1919      6 Sheets-Sheet 1

Inventor;
Frank L. Smith,
by Burke Burke
his Atty's

Witness:

June 17, 1924.

F. L. SMITH

PORTABLE POWER LATHE AND GRINDING MACHINE

Filed May 31, 1919    6 Sheets-Sheet 2

1,497,951

Inventor,
Frank L. Smith
by Burton & Burton
his Attys.

Witness

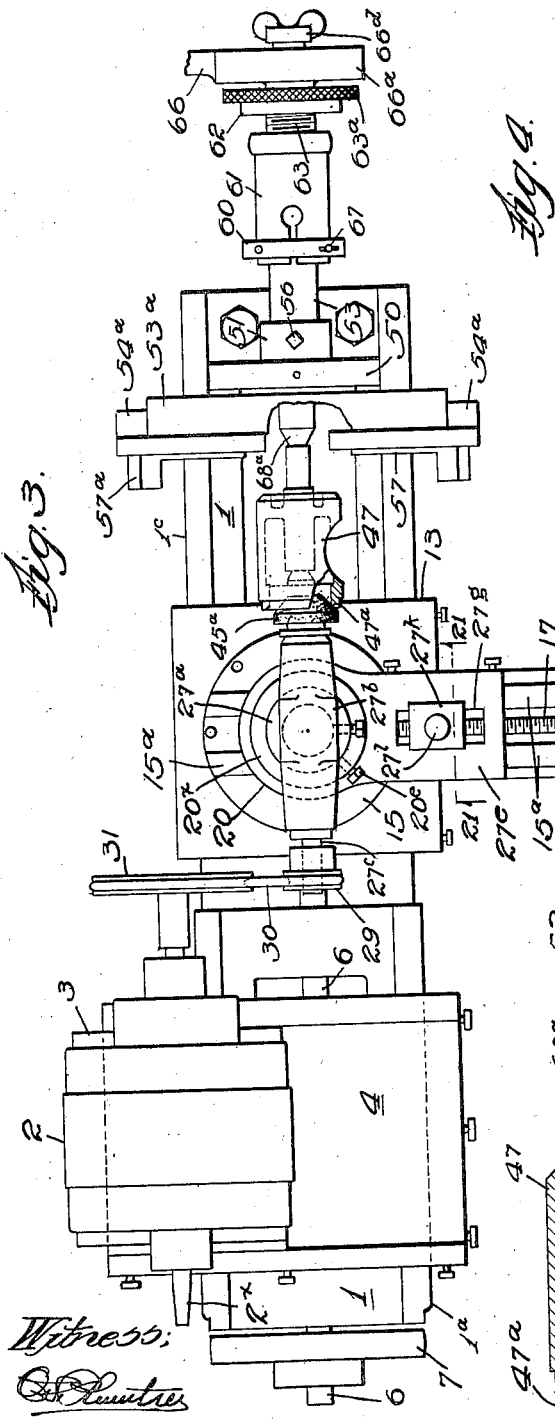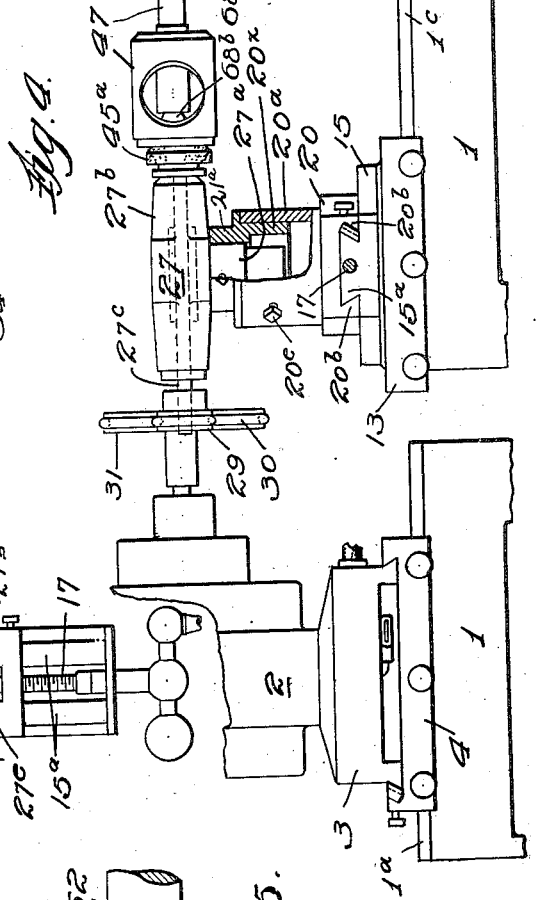

June 17, 1924.
F. L. SMITH
PORTABLE POWER LATHE AND GRINDING MACHINE
Filed May 31, 1919    6 Sheets-Sheet 4
1,497,951
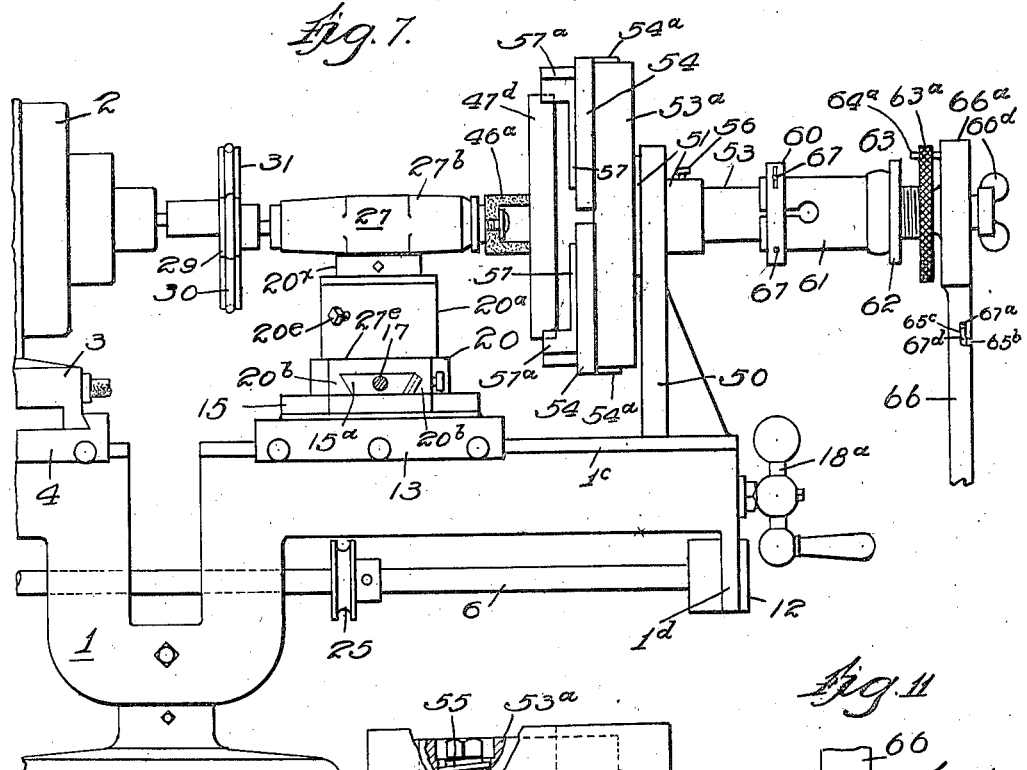
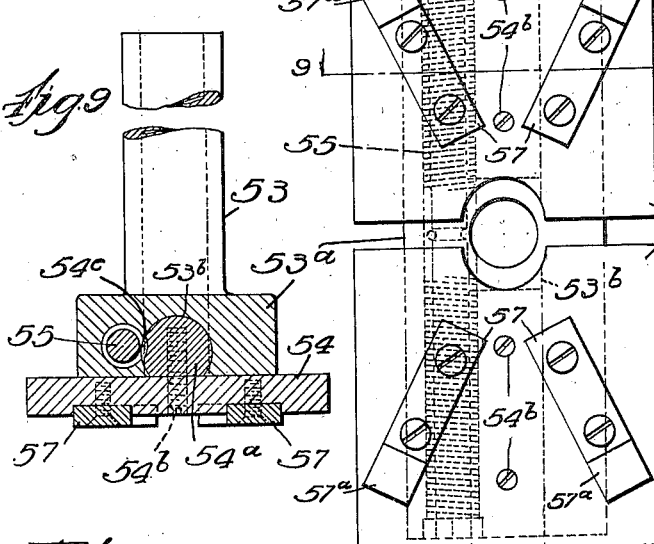
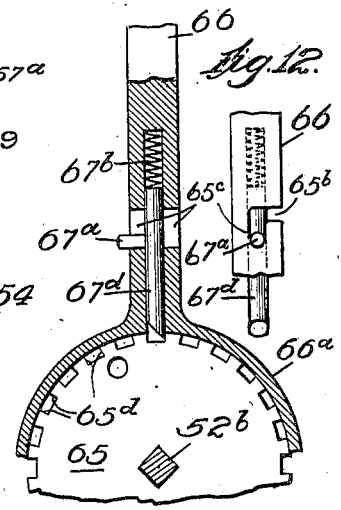
Inventor;
Frank L. Smith,

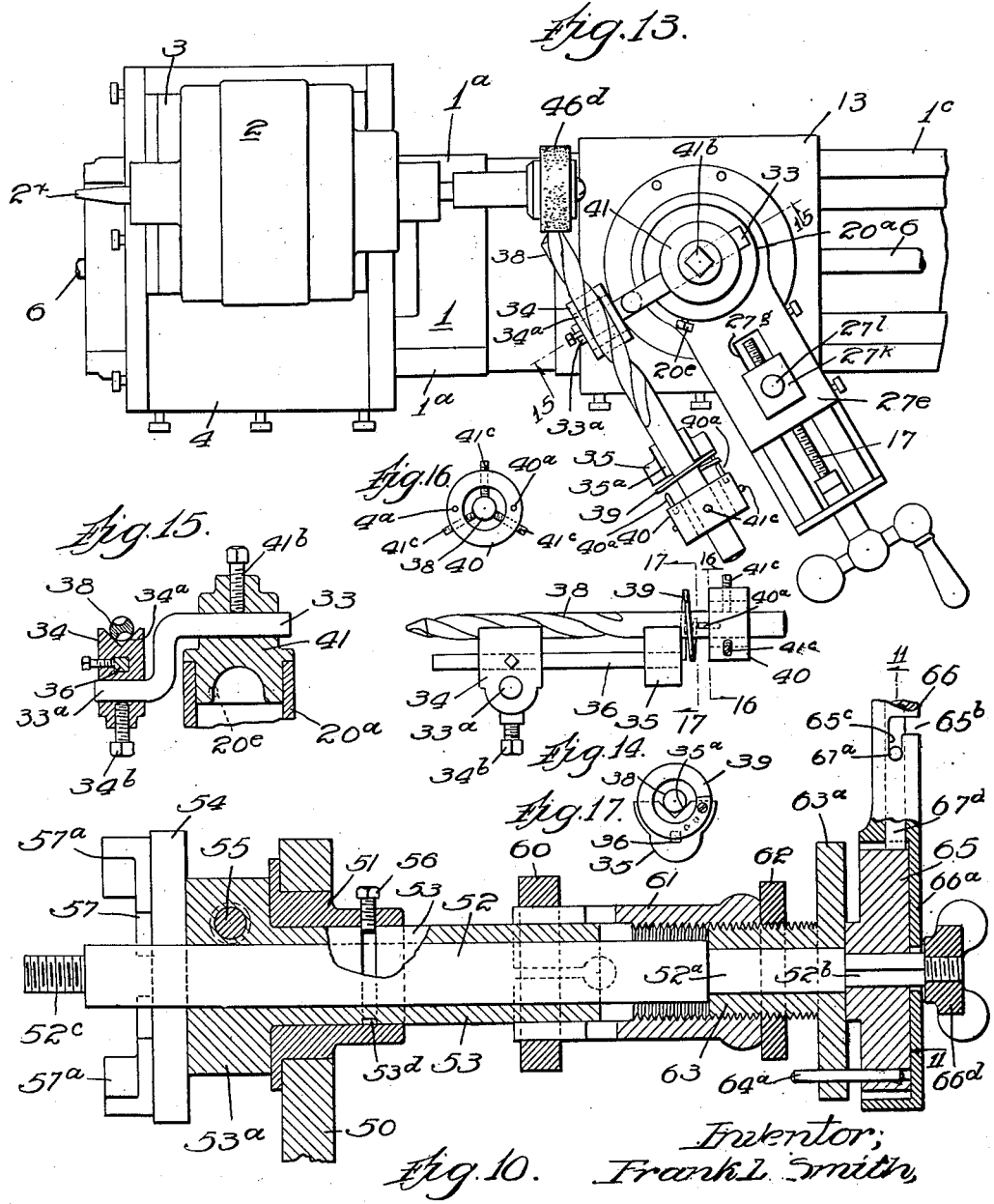

June 17, 1924.
F. L. SMITH
1,497,951
PORTABLE POWER LATHE AND GRINDING MACHINE
Filed May 31, 1919.  6 Sheets-Sheet 6
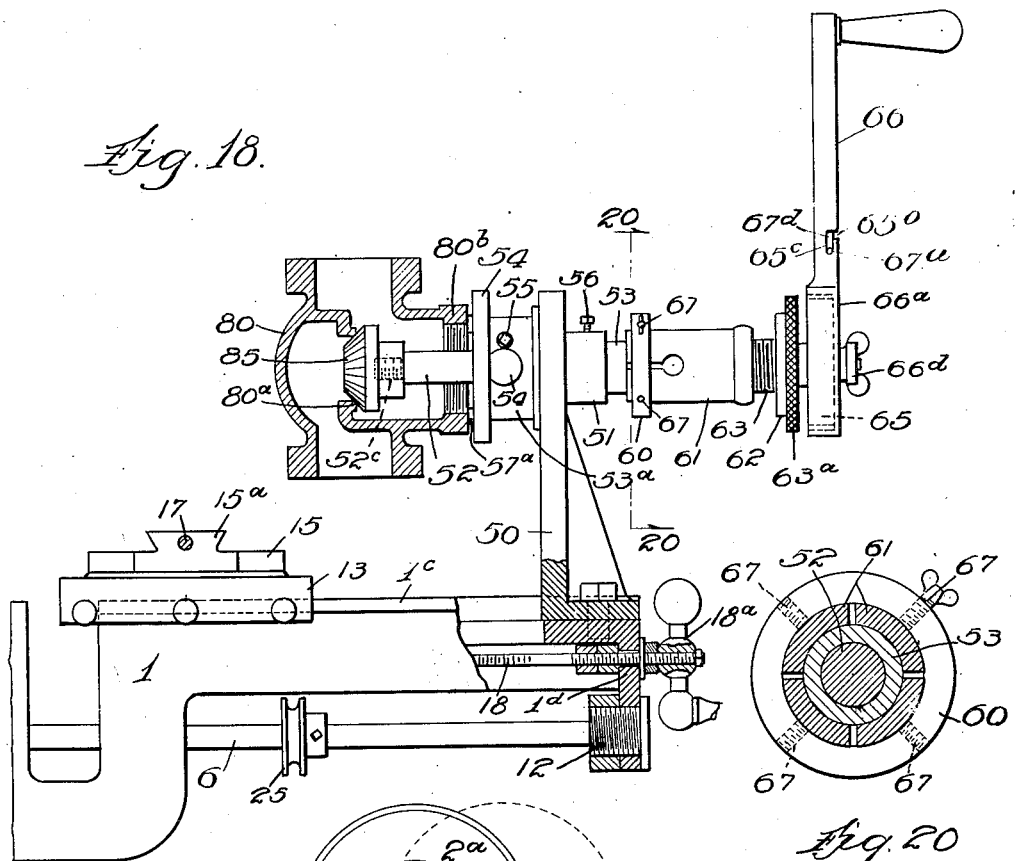
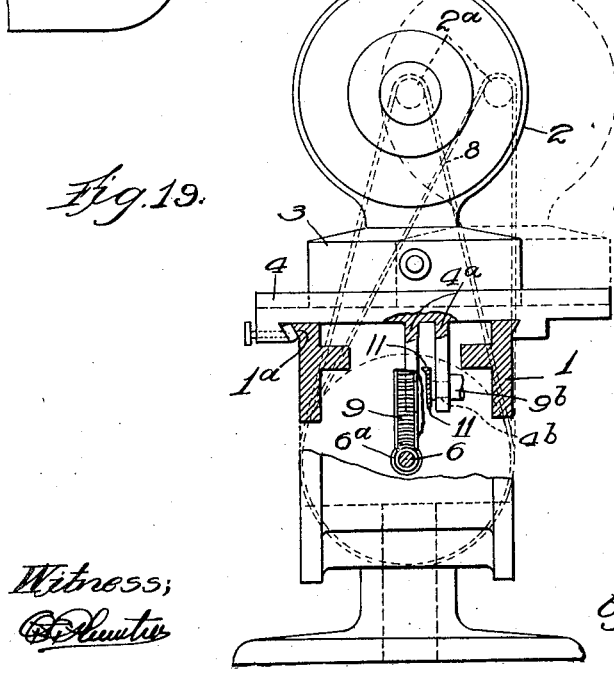

Patented June 17, 1924.

1,497,951

UNITED STATES PATENT OFFICE.

FRANK L. SMITH, OF CHICAGO, ILLINOIS.

PORTABLE POWER LATHE AND GRINDING MACHINE.

Application filed May 31, 1919. Serial No. 300,921.

*To all whom it may concern:*

Be it known that I, FRANK L. SMITH, a citizen of the United States, residing at Chicago, in the county of Cook and the State of Illinois, have invented certain new and useful Improvements in Portable Power Lathes and Grinding Machines, of which the following is a specification, reference being had to the accompanying drawings, forming a part thereof.

The purpose of this invention is to provide an improved portable machine for the purpose of redressing valves and valve seats and for analogous work. It consists in the elements and features of construction shown and described, as indicated in the claims.

In the drawings:

Figure 3 is a top plan view of the machine with certain parts substituted for parts shown in Figure 1, and with the motor at a different position of adjustment with respect to the bed.

Figure 4 is a detail elevation of the right hand portion of the machine with the part shown in Figure 3, said part being broken away, the tool or work holder and supporting carriage being partly shown in axial section.

Figure 5 is a detail axial section of the work and the immediate holder therefor, shown on Figure 4 on a larger scale than the larger figure.

Figure 7 is a front elevation of the machine except the right-hand motor-carrying portion which is broken away, having the substituted parts substantially as shown in Figure 3 adjusted for a different service and carrying a different tool for operating upon a different piece of work.

Figure 8 is a face view of the chuck shown in Figure 7.

Figure 9 is a section at the line, 9—9, on Figure 8.

Figure 10 is an axial section of a hand-operated shaft and chuck mounted in a fixed standard at the right-hand end of the machine, and which are shown in front elevation in Figure 7.

Figure 11 is a detail section at the line, 11—11 on Figure 10.

Figure 12 is a detail side elevation of parts adjacent to said figure in Figure 11.

Figure 13 is a plan view of a limited portion of the machine equipped with certain special tools and tool-holders for grinding drills and the like.

Figure 14 is a detail side elevation of holding, adjusting and operating devices for the drills to be ground as shown in Figure 13.

Figure 15 is a detail section at the line, 15—15, on Figure 13.

Figure 16 is a section at the line, 16—16, on Figure 14.

Figure 17 is a section at the line, 17—17, on Figure 14.

Figure 18 is a partly sectional front elevation of a portion of the machine at the right hand end, equipped with means for performing certain work by hand, the work being shown in section axial with respect to the operating tool.

Figure 19 is a section at the line, 19—19, on Figure 1.

Figure 20 is a section at the line, 20—20, on Figure 18.

Figure 21 is a section at the line, 21—21, on Figure 3.

Figure 1:
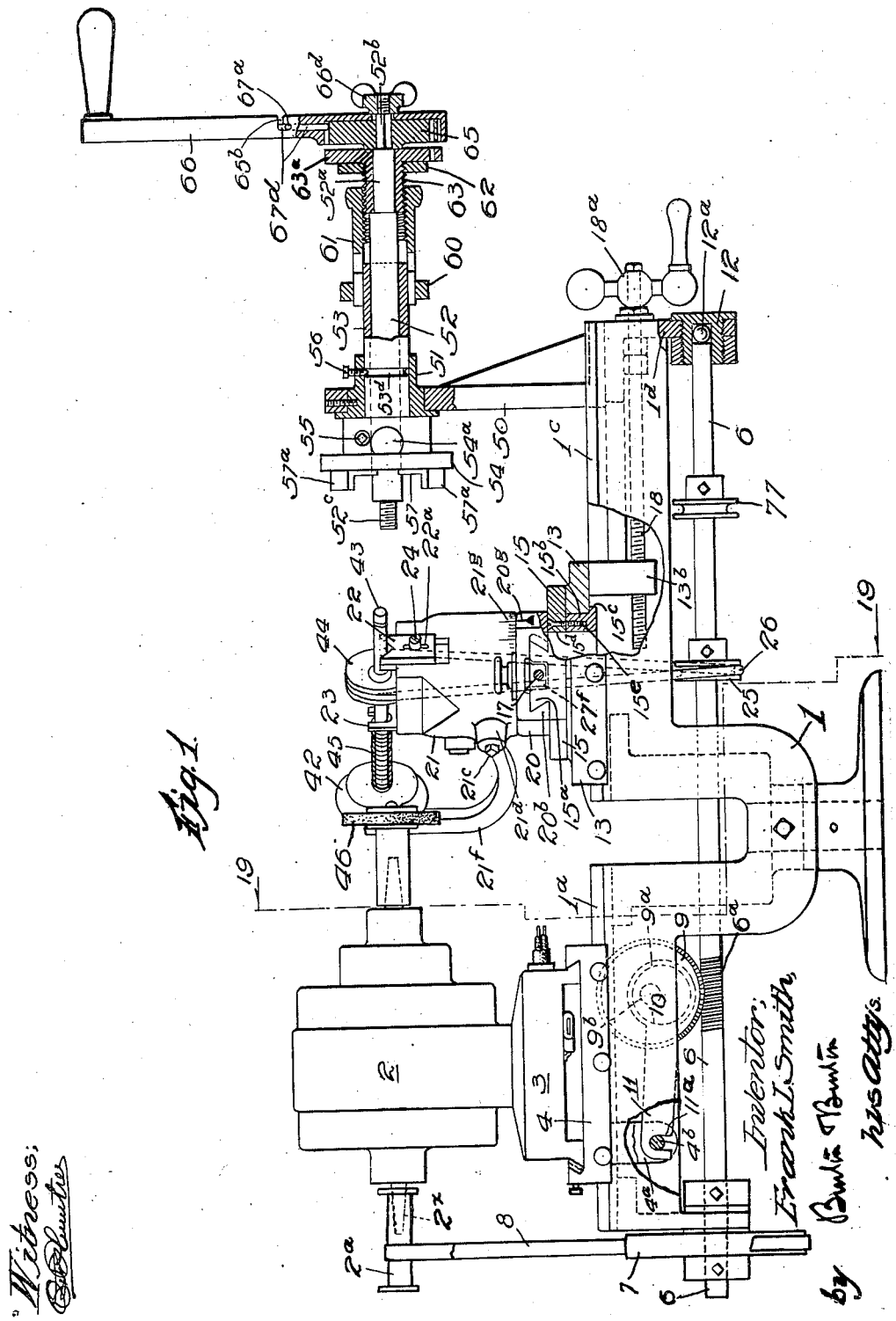
Figure 1 is a partly sectional side elevation of a machine embodying this invention, section being made axially with respect to a certain chuck support and hand-operated shaft at the right-hand end.

The machine illustrated in the drawing is designed to be a portable machine carrying an electric motor for actuating its various operating parts. It comprises the bed member, 1, upon which there is mounted a motor, 2, said motor being supported upon a carriage, 3, which is mounted for adjustment transversely of the bed by slide engagement with a longitudinally movable carriage, 4, which is mounted for longitudinal movement on the bed by engagement with the slideway, 1$^a$, formed upon the bed at the right-hand end portion of the latter. The motor shaft is provided at the left-hand end with a preferably disengageable pulley, 2$^a$, (the disengageability being indicated by the taper end of the motor shaft, 2$^x$, engaging a taper socket in the pulley), and a belt, 8, running from this pulley around a pulley, 7, upon a longitudinally-extending shaft, 6, which is journaled in the bed, serves for actuating said shaft, 6, by the rotation of the motor. For accommodating the longitudinal adjustment of the motor on the bed, the pulley, 2ª, is elongated as shown, and for accommodating the transverse adjustment of the motor on the bed, the belt, 8, is preferably an elastically-extensible belt, the pulley, 7, being crowning for retaining the belt in engagement with the pulley throughout the longitudinal adjustment of the motor taking advantage of the elongation of the pulley, 2ª. For certain purposes for which the machine is designed, the motor is to be reciprocated longitudinally on the bed, and for so reciprocating it a worm, 6ª, on the shaft, 6, engages a worm wheel, 9, journaled transversely in the bed member, having an eccentric boss, 9ª, upon which there is mounted for actuation thereby one end of a pitman or eccentric connecting member, 11, engaged by its eye, 10, journaled on said eccentric boss, the other end of the pitman having a notch, 11ª, which is engaged with a pin, 4ᵇ, which projects from a lug, 4ª, which extends downward from the carriage, 4, so that the rotation of the shaft, 6, which is actuated by the motor causes a relatively slow rotation of the worm gear, 9, and correspondingly slow reciprocation, by means of the eccentric described, of the carriage member, 4, on the bed, whereby the motor on said carriage is carried back and forth longitudinally of the bed, when the shaft, 6, is actuated by the rotation of the motor through the pulley and belt connection described. The longitudinal reciprocation of the motor is availed of for certain work for which the machine is designed, as hereinafter more particularly described.

Figure 2:
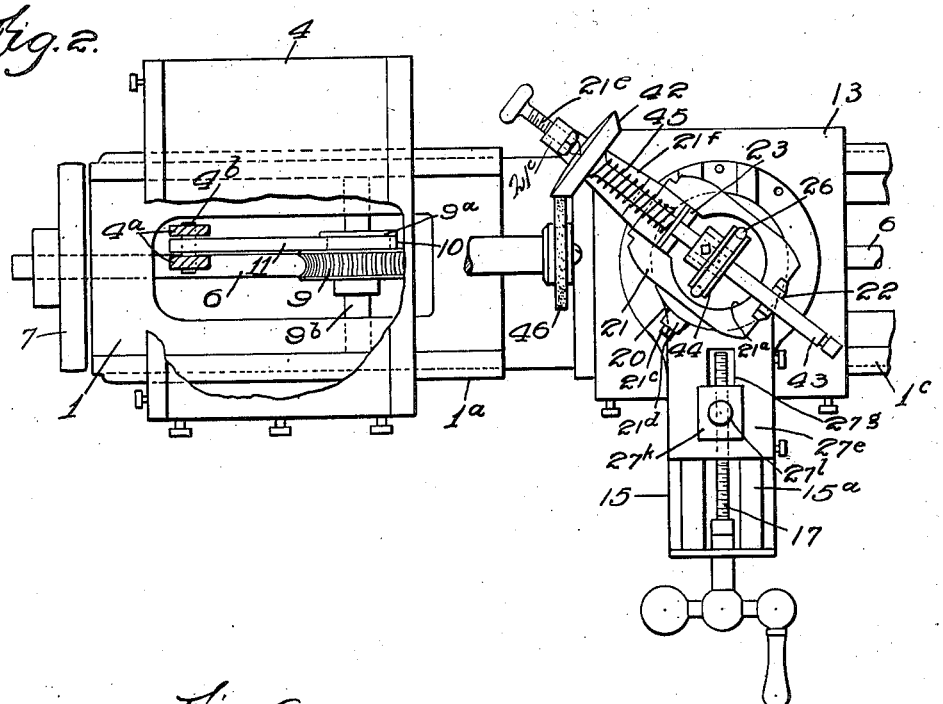
Figure 2 is a top plan view of portion of said machine, the right hand end portion being broken away and the motor removed and a portion of its carriage broken away to disclose the mechanism beneath.
Figure 6:
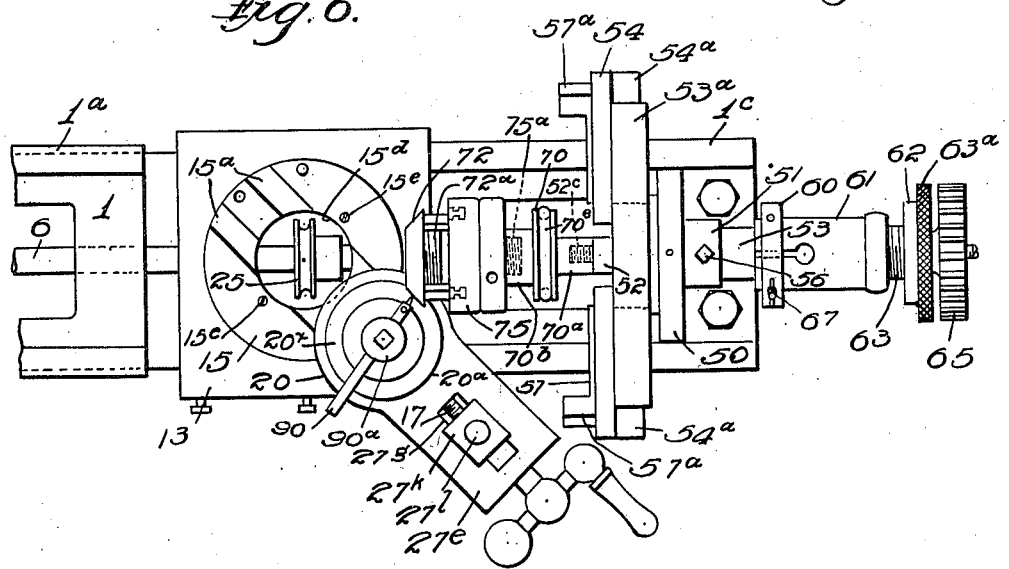
Figure 6 is a side view of the right hand portion of the machine having certain parts substituted for those shown in the preceding figures for performing a particular service.

Upon the bed, 1, there is mounted a second carriage;—that is, in addition to the carriage structure which carries the motor, 2,—this second carriage being for carrying work, a work or tool-holder, adapted for co-operation with work or tool which may be actuated by the motor shaft. This second carriage is shown in different forms. In the form in Figure 1 it comprises two parts, 20 and 21, having respectively the hollow cylindrical parts, 20ª and 21ª, and mounted for relative angular adjustment about their common axis. The lower of these two parts, 20, is mounted for adjustment transversely of the bed by engagement of dove-tail flanges, 20ᵇ, with which it is provided with a dove-tail slideway, 15ª, which is formed upon the upper member, 15, of a two part traveler, comprising a lower part, 13, and said upper part, 15, said two parts being connected for angular adjustment with respect to each other, and the lower part, 13, being mounted for longitudinal adjustment along the bed by dove-tail engagement shown at 1ᶜ, and requiring no particular description. Said two parts, 13 and 15, are connected for their relative angular adjustment by means of a sleeve or collar, 15ᵇ, which fits within a central opening in the part, 13, and has a flange, 15ᶜ, engaging under the margin of that opening, the interior diameter of the collar agreeing with the diameter of a circular opening, 15ᵈ, formed in the part, 15, as seen in Figure 6, the height of said collar, agreeing with the thickness of the part, 13, and the collar being secured to the under side of the part, 15, by means of screws, 15ᵉ. The lower member, 13, of the traveler, is propelled along the slideway, 1ᶜ, of the bed, 1, by means of a screw, 18, journaled in a web, 1ᵈ, at the right-hand end of the bed, 1, said screw being engaged with a threaded aperture in the lug, 13ᵇ, which projects down from said traveler, 13, and an operating crank handle, 18ª, being provided at the right-hand end of said screw, 18, outside of the right-hand end of the bed. The same web, 1ᵈ, carries the thrust bearing, for the end of the shaft, 6, said thrust bearing comprising a bushing, 12, screwed into the lug and carrying a thrust ball, 12ª, in the form clearly shown in Figure 1. The upper member, 21, of the said second carriage being hollow, as already indicated, is adapted to be positioned on the upper member, 15, of the traveler, by movement along the slideway thereof to bring its cavity substantially aligned with the circular opening mentioned in the upper member, 15, of the traveler, 15, 13, so that a drive belt shown at 26, can operate through the vertical passageway thus provided, for driving a tool or work-holding member, mounted upon the upper part of the carriage, as hereinafter explained, from a drive pulley, 25, secured upon the actuated shaft, 6, in the lower part of the bed. For mounting such tool or work-holder upon the upper end of the carriage member, 21, that member is provided with a bracket arm, 21ᶜ, for carrying a center point screw, 21ᵈ, and a crotch, 22, at the opposite side, in which there may be positioned a shaft, 43, which will be held in the bearing afforded by the crotch, 22, by the tension of the drive belt, said crotch, 22, having its V-shaped opening adapted to accommodate shafts of different sizes, and said crotch, being mounted adjustably on the carriage member, 21, by means of the clamping bolt, 24, engaging the slot, 22ª, in said crotch member, such adjustment being adapted to accommodate the varying diameters of the shaft members or like devices which may be lodged in said crotch for journaling, so as to bring the axis into the plane of the motor shaft and the center point mentioned. The use to which this second carriage is put, as shown in Figures 1 and 2, is for dressing such devices as a valve, 42, on its stem, 43, said stem, 43, being lodged in the crotch, 22, and having secured upon it for the purpose of rotating it, the pulley, 44. For this sort of work the carriage has at the left-hand side of the central opening a forked lug, 23, whose notch is aligned with the notch of the crotch member, 22, so that the shaft of the valve to be dressed extends through said notch, and a spring, 45, coiled about the valve stem or shaft reacting against the valve on the end of that stem and against said forked lug, serves to hold the valve steadily against the center point, of the screw, 21$^e$. The upper member, 21, of the carriage is adjusted about its vertical axis to bring the oblique face of the valve which is to be dressed in the proper position to be ground by the cylindrical milling tool or grinder, 46, which is mounted on the motor shaft, so that while the valve, carried as described, is rotated by medium of the belt, 26, from the actuated shaft, 6, the grinder, 46, on the motor shaft and rotated thereby, is reciprocated as the motor itself is reciprocated longitudinally by the worm gear and pitman connection above described, for accurately dressing the beveled face of the valve. In order that the angle of bevel of the valve may be accurately produced or accurately accommodated to the grinding tool, the two members, 20 and 21, of the carriage are provided, one with a graduated scale shown at 21$^g$, and the other with a reading point shown at 20$^g$, by means of which the operator may in advance, knowing the angle of bevel of the valve or other part to be dressed, adjust the two members of the carriage according to that angle. A set screw, 21$^c$, for holding which the member, 21, is provided with a lug, 21$^d$, is set against a cylindrical part, 20$^a$, of the carriage member, 20, for securing the two parts of the carriage in their angular adjustment for the purpose indicated.

For certain other classes of work there may be substituted for the carriage member, 21, a tool or work-holding member, 27, (see Figures 3 and 4), having a hollow cylindrical stem, 27$^a$, which fits within a bushing, 20$^x$, inserted in the cylindrical member, 20$^a$, of the carriage for angular adjustment with respect thereto. A set screw, 20$^e$, removably set through the member, 20$^a$, and impinging upon said hollow stem, 27$^x$, serving to secure the two parts in their relative angular adjustment. This tool or work-carrying member, 27, has at its upper end a horizontally-extending cross-head or journal bearing, 27$^b$, in which there may be journaled a stem or shank of a tool, as the shaft, 27$^c$, of a conical grinder, 45$^a$, adapted for dressing the interiorly-conical face of a certain valve member, 47, pertaining to a certain well known type of engine. For this mode of use of the machine, the motor is adjusted rearwardly transversely of the bed, a pulley, 31, is mounted on the right-hand end of its shaft, a pulley, 29, is mounted on the left-hand end of the shaft, 27$^c$, journaled as described in the second carriage, and an elastically extensible belt, 30, between the pulleys, 31 and 29, serves to rotate the shaft, 27$^c$, of the grinder tool, 45$^a$, for performing the process of dressing the interiorly-conical face, 47$^a$, of the valve, 47, which for that purpose is mounted and centered upon a spindle, 68, (see Fig. 5) having a centering cone-shoulder, 68$^a$, and a centering cone, 68$^b$, on the outer threaded end, said spindle, 68, being provided with a threaded socket at its right-hand end by which it is screwed onto the threaded terminal, 52$^c$, of a shaft, 52, which is rotatably mounted axially within the tubular shaft, or sleeve, 53, of a chuck device hereinafter more particularly described, and with respect to which said shaft, 52, for the presently described purpose is operable by hand, the entire device comprising said shaft and the chuck sleeve being journaled in a bushing, 51, carried by the rigid standard, 50, which is supported upon the right hand end of the bed as seen in Figures 1 and 18. The construction for advancing the shaft, 52, for advancing the work carried thereby against the tool consists of an interiorly-threaded sleeve, 61, which is clamped on the right-hand end of the hollow shaft, 53, of the chuck, (the means for clamping being hereinafter described), an exteriorly-threaded collar, 63, mounted on the reduced portion, 52$^a$, of the shaft, 52, at the right-hand end thereof, said collar, 63, having a knurled flange, 63$^a$, which is manipulated for thrusting the end of the collar, 63, against the shoulder occurring at the reduction, 52$^a$, while the operator may at the same time rotate the work for presenting successively the entire surface, 47$^a$, to the grinding tool, by means of a ratchet disk, 65, mounted on the still further reduced and squared portion, 52$^b$, at the right hand of said reduced portion, 52$^a$. The means for rotating said ratchet disk, 65, consists of a crank handle member, 66, which is provided with a cylindrical hood, 66$^a$, fitting over the ratchet disk for journaling the crank handle on said disk. Mounted for sliding in the stem of the crank handle is a dog, 67, (see Figures 11 and 12), which is thrust radially of the disk for engagement with the ratchet teeth thereof by a spring, 67$^b$. The ratchet teeth are square-shouldered, as seen clearly in Figure 11, and the inner end of the dog, 67ᵈ, is beveled at one side and said dog is adapted to be rotated 180 degrees in the handle for presenting its beveled face in either direction to the square shoulders, 65ᵈ, of the ratchet. A cross pin, 67ª, projecting from the dog in a slot, 65ᵇ, of the crank handle stem for so rotating the dog through 180 degrees to shift its beveled face as described, said slot, 65ᵇ, having two longitudinal offsets, 65ᶜ, parts around the axis of the stem and dog, in which the cross pin, 67ª, is engaged by the thrust of the spring for retaining the dog in either of its two positions for rotating the ratchet wheel in one direction or the other.

In Figure 7 the same tool carrier, 27, which is shown in Figures 3 and 4 is represented for employing a different form of grinding or dressing tool, 46ª, for facing off the flat faced valve member, 47ª, which is carried in the chuck, 54 (more particularly hereinafter described), said chuck being carried and rotated by the chuck-holder, 53, while the tool, 46ª, is rotated by the belt, 30, around the pulley, 31, on the motor shaft, and the pulley, 29, on the tool shaft, as hereinbefore described in respect to constructions shown in Figures 3 and 4; but with this difference, that in the construction shown in Figure 7, it is contemplated that the higher tool carriage shall be moved transversely while the rotation for dressing the valve member, 47ᵈ, is proceeding, so as to carry the tool, 46ª, entirely across the diameter of the valve. For this purpose the traveler member, 15, is adjusted with respect to the member, 13, to set the slideway, 15ª, directly transverse to the tool axis, the two members, 20 and 27, are secured fixedly with respect to each other by setting the screw, 20ᵉ, and the entire carriage comprising said two members, is operated on the slideway, 15ª, by means of the feed screw, 17, (see Figures 3 and 6) engaging the nut, 27ᶠ, which is adjustably secured in the radial extension, 27ᵉ, of the carriage member, 20. This nut, 27ᶠ, is made adjustable, as stated, in the carriage member, being mounted in a slot, 27ᵍ, having a stem, 27ʰ, a shoulder, 27ʲ, for engaging below the slot, 27ᵍ, of the said extension, 27ᵉ, and provided with a clamping washer, 27ᵏ, above said member, and a thumb nut, 27ˡ, screwed onto the stem above the clamping washer. The reason for providing this adjustment of the nut in the carriage member is to reduce the necessary length of the screw, 17; the range of movement which can be effected by the screw at any one position of the nut in the slot being sufficient to cover the compass of any single piece of work, and the length of the slot being designed to utilize that range at different zones around the axis of the chuck.

In performing work of this character, it will be understood that the chuck carrying the work to be dressed is rotated by hand by means of the crank, 65, which can either be rotated continuously or by back-and-forth vibration, taking advantage of the pawl-and-ratchet device above described, which may be made to rotate the work in either direction as already explained. When the chuck is to be thus rotated (instead of rotating the shaft, 52, within the chuck for advancing the work as explained in respect to the mode of use shown in Figures 3 and 4), the interiorly-threaded sleeve, 61, is clamped rigidly to the hollow chuck shaft, 53, the provision for so clamping it consisting in having said sleeve, 61, longitudinally split at its left-hand end, so that the fingers thus produced can be clamped upon the hollow shaft, 53, and a closely fitting collar, 60, encompasses the split end of the sleeve, 61, is caused to clamp the fingers as described by means of set screws, 67, set through the ring and impinging against the several fingers. In practice, it is not necessary to set more than one of the screws in order to effect adequate clamping. The jam nut, 62, is then set up tight against the outer end of the sleeve, 61, and then thereby the part, 63, is made fast to the sleeve, 61, and thereby fast to the chuck shaft or sleeve, 53, so that the rotation of the ratchet disk 65, by the crank, 66, with the pin, 64ª, engaging the flange, 63ª, of the part, 63, rotates the shaft, 52, and the chuck shaft, 53, together.

The specific construction of the chuck, 54, though not essential to the general operation of the machine, may require description. The chuck shaft, 53, terminates at the end for carrying the chuck in an enlarged head, 53ª, which has a transaxial circular bore at 53ᵇ, whose center is positioned nearer the base of the head than the radius of the bore, so that a transverse parallel-sided slot is formed across the face of said head whose width is a chord of the circle less than the diameter thereof. The two jaw-carrying members, 54, 54, of the chuck are each provided upon their back sides with a rib, 54ª, which is a truncated cylinder having the flat face which results from the truncation seated against the back of the head, said rib being secured by screws, 54ᵇ, said truncated cylindrical rib being fitted to the truncated bore, 53ᵇ, whereby the two chuck members, 54, are mounted for sliding radially toward and from each other over the face of the head, 53ª. For reciprocating them to adjust the jaws, 57, which they carry, as hereinafter more completely explained, there is journaled in the head, 53ª, a screw, 55, having its two end portions oppositely threaded for engagement with the truncated cylindrical ribs, 54ª, of the two members, 54, 54, which are rack-toothed for such engagement as indicated at 54ᵉ. The jaw pieces, 57, of which two are secured to each of the members, 54, are adapted to be reversed in their mounting upon said members, 54, for engaging their heads, 57ᵃ, either inside or outside of the work to be held.

In Figure 6 there is illustrated a mode of use of this machine in which the power is applied to the rotatable parts of said shaft which are journaled upon the fixed standard, 50, for rotating a piece of work to be held by said parts or one of them, in relation to a tool which may be carried upon the tool-or-work-holder mounted upon the second carriage. In the case illustrated in Figure 6, the work consists of a tapered valve, 72, whose tapered face is to be dressed, and for this purpose the traveler member, 15, is adjusted with respect to the member, 13, for inserting the slideway, 15ᵃ, at the angle to the bed and operating shafts, corresponding to the taper to be produced or finished upon the work, 72; a proper tool-holder, 90ᵃ, for carrying the dressing tool, 90, is mounted in the bushing, 20ˣ, of the carriage member, 20ᵃ, in place of the member, 27, and the carriage is withdrawn along said obliquely adjusted slideway to properly position the tool with respect to the work. Said piece of work, 72, is represented as having a threaded axial boss, 72ᵃ, by which it is held in a chuck, 75, of familiar form. For this sort of work the machine comprises as an appurtenance a pulley, 70, having hubs, 70ᵃ, and 70ᵇ, projecting oppositely, the hub, 70ᵃ, being interiorly threaded for screwing onto the threaded terminal, 52ᶜ, of the shaft, 52, and the hub, 70ᵇ, being similarly interiorly threaded for receiving the threaded stem, 75ᵃ, of the chuck, 75. The shaft, 6, carries a pulley, 77, which is adapted to be adjusted longitudinally on said shaft into the plane of the pulley, 70, and a belt, 70ᵉ, connects the two pulleys for driving the shaft, 52, by the shaft, 6. When using the machine in this manner, the crank, 66, may be removed, the shaft, 52, being thereby left free to rotate without embarrassment by reason of the unbalancing which the crank would cause. The ratchet disk, 65, may also be removed or may be disconnected from the adjusting sleeve member, 66ᵃ, by removing the pin, 64ᵃ. The shaft thus becomes journaled for rotation in the hollow stem or shaft, 53, of the chuck, and the latter may be held non-rotatable by setting the screw, 56, in the bushing, 51, which forms the journal bearing of the chuck stem down to the bottom of the groove, 53ᵈ.

Figure 18 shows an entirely hand use of the portion of the machine which is mounted upon the standard, 50. The work here shown consists in dressing the interior seat, 80ᵃ, a valve body, 80, by means of a milling tool, 85, which is screwed onto the end of the shaft, 52, while the valve body is held by the chuck, 54, which is represented as holding the valve body by the engagement of the jaws, 57ᵃ, on the outside of the latter. It will be understood that in some cases, according to the size of the piece of work being operated upon, the engagement would be effected by reversing the jaws as above described, to engage inside the interiorly-threaded stem, 80ᵇ, of the valve body. In this mode of use, it will be understood that the chuck itself is held stationary while the shaft, 52, is rotated by means of the crank, 66. The shaft being advanced toward the work as required by the progress of the work, by the operator manipulating the knurled flange, 63ᵃ, of the threaded sleeve, 63, the pin, 64ᵃ, being absent so that there is no operating connections from the crank to said sleeve, 63.

In Figures 13, 14, 15, 16 and 17, there is shown a method of employing the second carriage in conjunction with the motor and a grinding tool carried on its shaft for dressing a tool which may be carried on the carriage. The tool shown and being operated upon is an ordinary twist drill, requiring its cutting faces to be ground at the same angle, and so as to properly intersect at the axis of the tool. For the grinding the motor shaft has a cylindrical grinder, 46ᵈ. Into the upper end of the cylindrical member, 20ᵃ, of the carriage, there is inserted a plug, 41, which is set in the member, 20ᵃ, by means of a screw, 20ᵉ, for holding at a proper angle projecting from the plug, a crank member, which is adjustable about its stem or shaft, 33, in said plug, and may be secured as adjusted angularly by a set screw, 41ᵇ. On the crank wrist, 33ᵃ, of this crank member, there is mounted a tool rest, 34, having a V-shaped seat, 34ᵃ, at its upper side for the tool which is to be ground, shown at 38. A set screw, 34ᵇ, is provided for clamping the tool rest at the proper angular adjustment on the crank wrist, 33ᵃ. A square stem, 36, extends through the tool rest below the tool seat thereof, and parallel thereto, and carries at its rear end a second rest, 35, for lodging the rear end of the tool, said rest having a V-shaped seat, 35ᵃ, at its upper side for that purpose, aligned with the seat, 34ᵃ, of the rest, 34. There is provided a gauge member or stop member, 40, adapted to be clamped and centered upon the shank of the drill, 38, by means of three radially-set screws, 41ᶜ; and upon the rear or outer face of the rest, 35, there is secured a helical spring stop, 39, one end being rigidly secured to the said rest and the other end adjustably held by an adjusting screw, 39ᵃ, for the purpose of varying the amount of longitudinal movement imparted to the drill through 180 degrees. The gauge member, 40, has projecting from its forward face, two diametrically-opposite pins, 40ª. It is designed that this gauge member should be clamped upon the drill with these two pins aligned respectively with the middle point of the two faces to be produced upon the end of the drill; one of the pins, 40ª, is now lodged against the foremost projecting end of the helical track member, 39; that is, the end having through it the adjusting screw, 39ª, and the tool is then rocked in the rests, 34 and 35, to bring the other pin, 40ª, against the projecting end of the track member, while the first mentioned pin is kept in contact with the said track member, thus thrusting the tool forward against the grinder, producing the "backing" or clearance desirable in that class of tools. It is to be understood that each of the two faces are similarly treated. The purpose of the adjusting screw, 39ª, is to vary the amount of such backing or clearance in any given instance.

It will be understood that the tool carrier in this mode of use may be adjusted for being advanced bodily to advance the tool which is being dressed, (which constitutes the work), against the grinding tool, 46ᵈ, by adjusting the member, 20, of the traveler with respect to the member, 15, to position the slideway, 15ª, at the angle to the motor shaft at which the tool to be ground should be set for proper shaping of the end to be ground; and that by this means the entire tool may be advanced toward the grinder to a greater extent than that made possible by the depth of the spiral shaped track, 39.

I claim:—

1. In a structure which comprises a motor, a carriage therefor, a bed member on which the carriage is mounted, and a shaft actuated by the motor journaled on the bed member, in combination with said elements, a second carriage mounted on said bed member angularly adjustable with respect to the motor shaft; a pulley mounted on said second-mentioned carriage; driving connections to said pulley from said actuated shaft on the bed member, the operating connections from said actuated shaft to the motor carriage being adapted for reciprocating the motor longitudinally on its shaft.

2. In a machine for the purpose indicated a bed member, a motor and carriage therefor carried by the bed member; an actuated shaft journaled on the bed member and driving connections thereto from the motor shaft, a second carriage mounted on the bed member, a shaft journaled in the second carriage, and driving connections to said shaft from the actuated shaft on the bed member.

3. In combination with the construction defined in claim 1, a shaft journaled in said second carriage and driving connections to said last mentioned shaft from the motor-actuated shaft on the bed member.

4. In the construction defined in claim 2 foregoing, the second carriage being mounted for angular adjustment, and the shaft driving connections being adapted to permit such adjustment.

5. In the construction defined in claim 2, the means for supporting the second carriage on the bed comprising a traveler mounted for transverse sliding movement and a slide-way therefor.

6. In the construction defined in claim 2, foregoing, means for supporting the second carriage on the bed member comprising a traveler mounted for sliding adjustment longitudinally of the bed, and a transverse slideway thereon, said second carriage being engaged in said transverse slideway.

7. In the construction defined in claim 2, means for supporting the second carriage on the bed member comprising a traveler mounted for sliding adjustment longitudinally of the bed, and means for so adjusting it.

8. In the construction defined in claim 2, the means for supporting the second carriage on the bed comprising a traveler mounted for transverse sliding movement, and a slideway therefor, said slideway being mounted for angular adjustment in a horizontal plane.

9. In the construction defined in claim 2, the means for supporting the second carriage on the member, comprising a traveler mounted for sliding adjustment longitudinally of the bed and having a transverse slideway, said second carriage being engaged in said transverse slideway, said slideway being mounted for angular adjustment horizontally on the longitudinally sliding traveler.

10. In a machine for the purpose indicated, in combination with a bed member, an actuated shaft journaled therein, a carriage mounted on said bed member having a vertical cavity extending through it, a shaft journaled on said carriage, driving connections from the shaft on the bed member to the shaft on the carriage, extending through said vertical cavity, and two upwardly-open crotches adapted for lodgment of the shaft, one of said crotches being vertically adjustable to adjust the alignment of said shaft.

11. In a machine for the purpose indicated, in combination with a bed member, an actuated shaft journaled therein, a carriage mounted on the bed member having a vertical cavity extending through it, a shaft journaled on said carriage, and driving connections from the shaft on the bed member to the shaft on the carriage, extending through said vertical cavity, said carriage comprising two hollow members telescoped one upon the other, one having an annular shoulder to limit the telescoping and constitute a seat on which the other member lodges and turns in the angular adjustment.

12. In a structure which comprises a motor, a carriage therefor, a bed member on which the carriage is mounted, and a shaft actuated by the motor journaled on the bed member, in combination with said elements, a second carriage mounted on the bed, a member by means of which said carriage is supported having a slideway with which the carriage is engaged, said member being angularly adjustable on the bed, a tool post carried by said carriage, and means for propelling the carriage with the tool post along said slideway.

13. In a structure which comprises a motor, a carriage therefor, a bed member on which the carriage is mounted, and a shaft actuated by the motor journaled on the bed member, in combination with said elements, a second carriage mounted on the bed member, a shaft journaled in said second carriage and driving connections to said last mentioned shaft from the motor-actuated shaft on the bed member, the means for supporting the second carriage on the bed member comprising a traveler mounted for sliding longitudinally of the bed, and having a transverse slideway, said second carriage comprising two parts of which one is engaged with said slideway, and the second is mounted for angular adjustment on the first.

14. In a structure which comprises a motor, a carriage therefor, a bed member on which the carriage is mounted, and a shaft actuated by the motor journaled on the bed member, in combination with said elements, a second carriage, a support for said second carriage comprising a member mounted for longitudinal adjustment on the bed, a second member mounted on the first for angular adjustment with respect thereto, said second member having a slideway, the carriage being engaged for movement along said slideway, and a tool-post carried by the carriage.

15. In combination with the construction defined in claim 14 foregoing, a second carriage comprising two members angularly adjustable with respect to each other about a vertical axis, the engagement for movement on the carriage along the slideway, being with one of said members, and the tool post being carried by the other member.

16. In combination with a bed member, a motor carried on the bed member; an actuated shaft extending longitudinally of the bed member, and driving means from the motor to said shaft; a carriage on the bed member; means by which it is supported thereon; the carriage being slidable on said supporting means and said supporting means being angularly adjustable on the bed, a tool or work-holder mounted on the carriage and driving means from the actuated shaft on the bed to said tool or work-holder.

17. In combination with a bed member, a motor carried thereby and adjustable transversely thereon; a carriage on the bed member adjustable horizontally thereon and a tool or work-holder on said carriage adjustable angularly therein, and means for effecting said adjustments.

18. In combination with a bed, a motor mounted and adjustable transversely thereon; a carriage mounted on the bed, the means for supporting it thereon comprising an angularly adjustable member; the carriage and said member having slide engagements with each other for movement of the carriage in a direction determined by the angular adjustment of said member, and a tool or work-holder carried on the carriage.

19. In combination with the bed, a motor having its carriage mounted and longitudinally movable on the bed; a second carriage on the bed member adjustable transversely thereon, and a tool or work-holder angularly adjustable on said second carriage.

20. In the construction defined in claim 19, a shaft on the bed, driving means thereto from the motor shaft, and driving means therefrom to the tool or work-holder of the second carriage.

21. In the construction defined in claim 19, an actuated shaft on the bed, driving connections thereto from the motor shaft, and operating connections therefrom to the motor carriage for reciprocating the motor longitudinally on the bed.

22. In combination with the bed, a motor having its carriage mounted and transversely adjustable on the bed, a second carriage transversely adjustable on the bed; a tool-holder on said second carriage; driving means from the motor shaft; a standard on the bed and a tool or work-holder mounted in said standard, and means for rotating said tool or work-holder.

In testimony whereof, I have hereunto set my hand at Chicago, Illinois, this 29th day of May, 1919.

FRANK L. SMITH.